United States Patent
Li et al.

(10) Patent No.: US 10,037,362 B1
(45) Date of Patent: *Jul. 31, 2018

(54) MINING PROCEDURE DIALOGS FROM SOURCE CONTENT

(71) Applicant: INTERNATIONAL BUSINESS MACHINES CORPORATION, Armonk, NY (US)

(72) Inventors: Qi Cheng Li, Beijing (CN); Li Jun Mei, Beijing (CN); Jian Wang, Beijing (CN); Yi Peng Yu, Beijing (CN); Xin Zhou, Beijing (CN)

(73) Assignee: International Business Machines Corpoation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,421

(22) Filed: Dec. 14, 2017

Related U.S. Application Data (63) Continuation of application No. 15/657,654, filed on Jul. 24, 2017.

(51) Int. Cl.
| | |
|---|---|
| *G06F 17/27* | (2006.01) |
| *G06F 17/30* | (2006.01) |
| *G06K 9/62* | (2006.01) |
| *G10L 15/18* | (2013.01) |

(Continued)

(52) U.S. Cl.
CPC .. *G06F 17/30539* (2013.01); *G06F 17/30528* (2013.01); *G06K 9/6269* (2013.01); *G06F 17/16* (2013.01); *G06F 17/30398* (2013.01); *G06Q 10/06* (2013.01); *G10L 15/1815* (2013.01)

(58) Field of Classification Search
CPC ......... G06F 17/30011; G06F 17/30719; G06F 17/271; G06F 17/277; G06F 17/2785; G06F 17/279
See application file for complete search history.

(56) References Cited

U.S. PATENT DOCUMENTS

| | | |
|---|---|---|
| 7,386,839 B1 | 6/2008 | Golender et al. |
| 8,612,233 B2 | 12/2013 | Anand et al. |
| 8,977,540 B2 | 3/2015 | Yasin |

(Continued)

FOREIGN PATENT DOCUMENTS

| | | |
|---|---|---|
| WO | 2015170963 A1 | 11/2015 |
| WO | 2017112813 A1 | 6/2017 |

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Taelor Kim
(74) *Attorney, Agent, or Firm* — Michael A. Petrocelli (57) ABSTRACT

An embodiment of the invention may include a method, computer program product and computer system for human-machine communication. The method, computer program product and computer system may include a computing device that maps linguistic data of source content to a vector. The computing device may cluster the linguistic data of source content. The computing device may determine a plurality of segments based on the mapped linguistic data and the clustered linguistic data. The computing device may transform a segment of the plurality of segments into representative data, the representative data is a function of the remaining plurality of segments.

1 Claim, 11 Drawing Sheets

(51) Int. Cl.
*G06F 17/16* (2006.01)
*G06Q 10/06* (2012.01)

(56) References Cited

U.S. PATENT DOCUMENTS

| | | |
|---|---|---|
| 9,430,570 B2 | 8/2016 | Button et al. |
| 9,471,872 B2 | 10/2016 | Anand et al. |
| 2002/0087949 A1 | 7/2002 | Golender et al. |
| 2010/0318846 A1 | 12/2010 | Sailer et al. |
| 2012/0102050 A1 | 4/2012 | Button et al. |
| 2014/0067378 A1 | 3/2014 | Anand et al. |
| 2016/0239480 A1 | 8/2016 | Larcheveque et al. |

OTHER PUBLICATIONS

Wang et al., "CSE: Conceptual Sentence Embeddings based on Attention Model", Proceedings of the 54th Annual Meeting of the Association for Computational Linguistics, Aug. 7-12, 2016, pp. 505-515, Copyright 2016, Computational Linguistics, Berlin, Germany.
Palangi et al., "Deep Sentence Embedding Using Long Short-Term Memory Networks: Analysis and Application to Information Retrieval", IEEE/ACM Transactions on Audio, Speech, and Language Processing, Jan. 21, 2016, pp. 1-25, vol. 24, Issue 4, British Columbia, Vancouver.
Ginzburg et al., "Computational Models of Dialogue", Computational Linguistics and Natural Language Processing Handbook, Jun. 29, 2010, pp. 1-64, Copyright 2010, Blackwell Publishing Ltd., Department of Computer Science, King's College, London, UK.
Pending U.S. Appl. No. 15/657,654, filed Jul. 24, 2017, entitled: "Mining Procedure Dialogs From Source Content", pp. 1-37.
IBM: List of IBM Patents or Patent Applications Treated as Related (Appendix P), Jan. 9, 2018, pp. 1-2.

MINING PROCEDURE DIALOGS FROM SOURCE CONTENT

BACKGROUND

The present invention relates generally to a method, system, and computer program for mining procedure dialogs from source content containing linguistic data. More particularly, the present invention relates to a method, system, and computer program for embedding linguistic data of source content to identify and generate procedure flows.

Data embedding is a process that maps segments of linguistic data, e.g. words and/or sentences, to vectors of real numbers. Data embedding enables the prediction of certain data segments based on the data segments that surround that data segment based on the relationships of those segments in a vector. Data embedding also enables the prediction of a surrounding data segments based on a single data segment based on the relationships of those segments in a vector.

BRIEF SUMMARY

An embodiment of the invention may include a method, computer program product and computer system for human-machine communication. The method, computer program product and computer system may include a computing device that maps linguistic data of source content to a vector. The computing device may cluster the linguistic data of source content. The computing device may determine a plurality of segments based on the mapped linguistic data and the clustered linguistic data. The computing device may transform a segment of the plurality of segments into representative data, the representative data is a function of the remaining plurality of segments.

BRIEF DESCRIPTION OF THE DRAWINGS

FIG. 1b illustrates example operating modules of the procedure dialog mining program of FIG. 1a;

DETAILED DESCRIPTION

Embodiments of the present invention will now be described in detail with reference to the accompanying Figures.

Figure 1A:
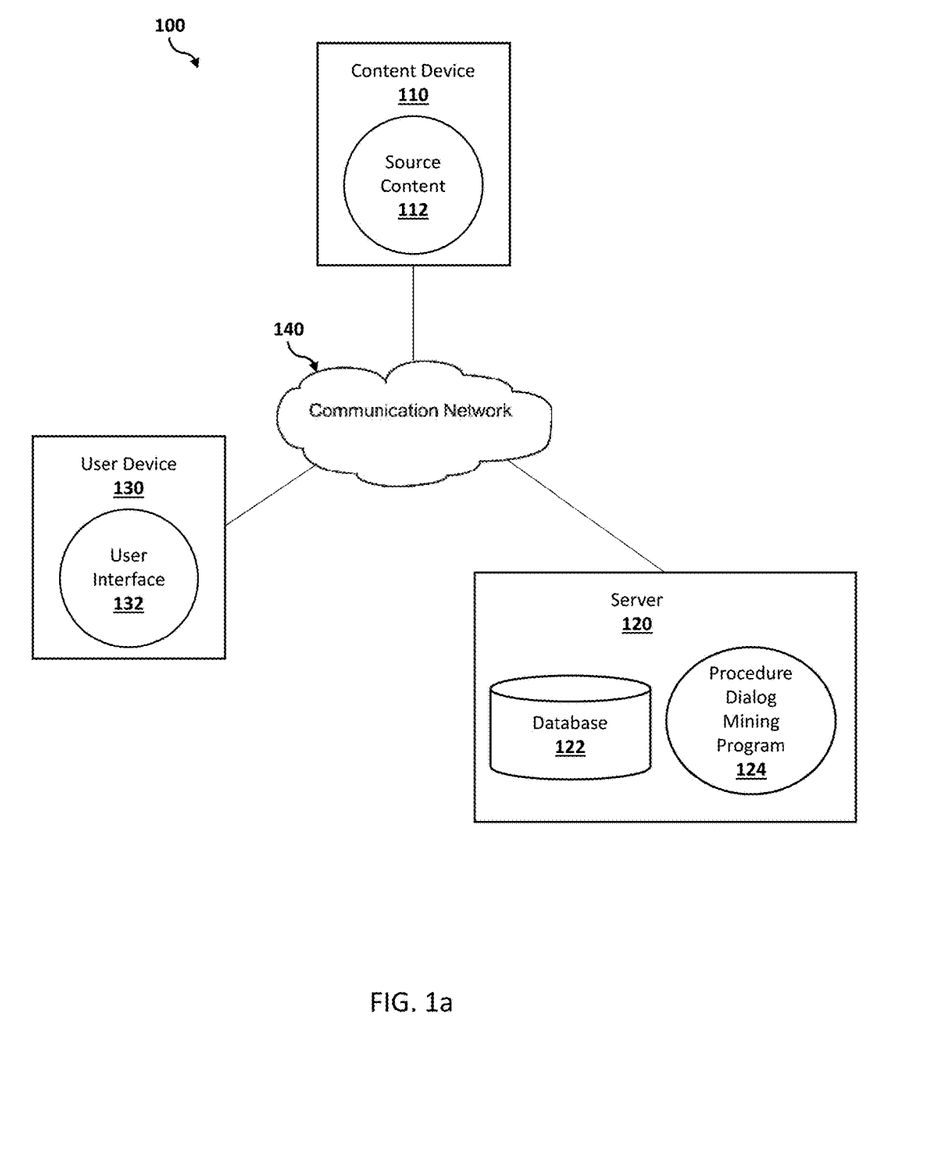
FIG. 1a illustrates a system for mining procedure dialogs from source content, in accordance with an embodiment of the invention.

FIG. 1a illustrates a procedure dialog mining system 100, in accordance with an embodiment of the invention. In an example embodiment, procedure dialog mining system 100 includes procedure dialog mining server 120, content device 110, and user device 130 interconnected via network 140.

In the example embodiment, network 140 is the Internet, representing a worldwide collection of networks and gateways to support communications between devices connected to the Internet. Network 140 may include, for example, wired, wireless or fiber optic connections. In other embodiments, network 140 may be implemented as an intranet, a local area network (LAN), or a wide area network (WAN). In general, network 140 can be any combination of connections and protocols that will support communications between procedure dialog mining server 120, user device 130, and content device 110.

Content device 110 may contain source content 112. Content device 110 may be a desktop computer, a notebook, a laptop computer, a tablet computer, a handheld device, a smart-phone, a thin client, or any other electronic device or computing system capable of storing audio, visual, or textual content and receiving and sending that content to and from other computing devices such as procedure dialog mining server 120 via network 140. In some embodiments, content device 110 includes a collection of devices, or data sources, in order to mine procedure dialogs. Content device 110 is described in more detail with reference to FIG. 8.

Source content 112 is a collection of linguistic data located in files including, but not limited to, for example, audio, visual and textual content. Source content 112 may be, for example, call center records, technical documents, question and answer forum data, and websites. Source content 112 is located on content device 110 that can be accessed through using network 140.

User device 130 may include user interface 132. User device 130 may be a desktop computer, a notebook, a laptop computer, a tablet computer, a handheld device, a smart-phone, a cellular phone, a landline phone, a thin client, or any other electronic device, computing system, wired or wireless device capable of receiving and sending content to and from other computing devices, such as procedure dialog mining server 120, via network 140. User device 130 is described in more detail with reference to FIG. 8.

User interface 132 includes components used to receive input from a user and transmit the input to procedure dialog mining program 124 residing on procedure dialog mining server 120, or conversely to receive information from procedure dialog mining program 124 and display the information to the user. In an example embodiment, user interface 132 uses a combination of technologies and devices, such as device drivers, to provide a platform to enable users of user device 130 to interact with procedure dialog mining program 124. In the example embodiment, user interface 132 receives input, such as textual input received from a physical input device, such as a keyboard.

Procedure dialog mining server 120 includes procedure dialog mining program 124 and procedure dialog mining database 122. In the example embodiment, procedure dialog mining server 120 may be a desktop computer, a notebook, a laptop computer, a tablet computer, a thin client, or any other electronic device or computing system capable of storing compiling and organizing audio, visual, or textual content and receiving and sending that content to and from other computing devices, such as user device 130 and content device 110, via network 140. Procedure dialog mining server 120 is described in more detail with reference to FIG. 7.

Procedure dialog mining database 122 is a collection of procedure knowledge graphs, obtained from processing source content 112 by procedure dialog mining program 124. The procedure knowledge graphs may contain information concerning relationships or cohesions between specific elements of source content 112 (topics, sentences, words, etc.). Additionally, the data may contain indexing information about the relationship or cohesion between the specific elements.

Procedure dialog mining program 124 is a program capable of building procedure dialog mining database 122 from source content 112, and retrieving specific content to be displayed by user interface 132 based on input received on user interface 132.

Figure 1B:
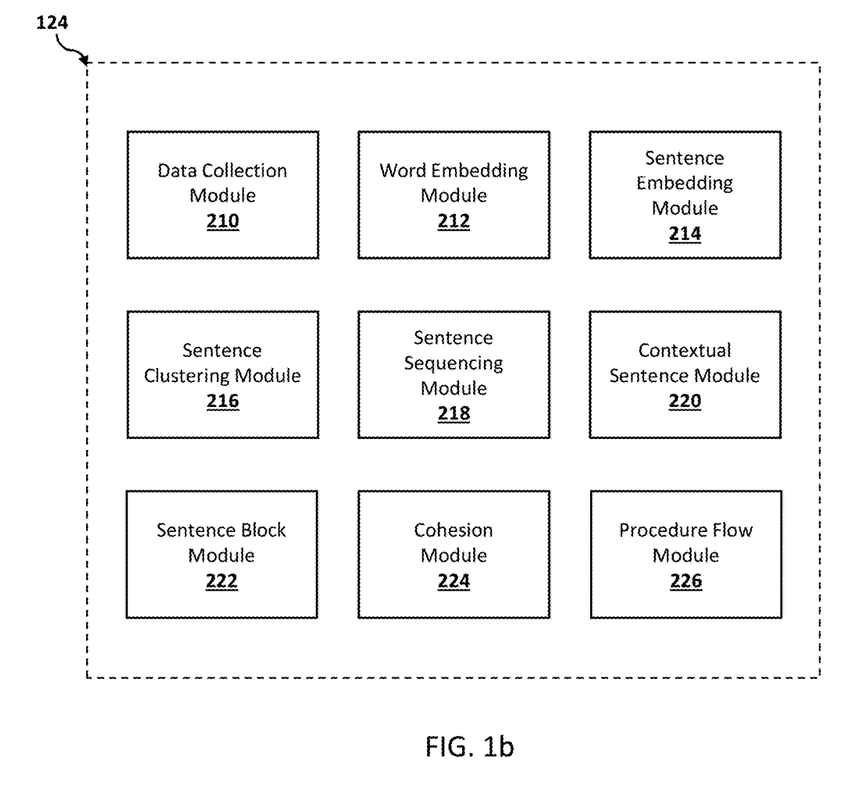

FIG. 1b illustrates example modules of procedure dialog mining program 124. In an example embodiment, procedure dialog mining program 124 may include nine modules: data collection module 210, word embedding module 212, sentence embedding module 214, sentence clustering module 216, sentence sequencing module 218, contextual sentence module 220, sentence block module 222, cohesion module 224, and procedure flow module 226.

Data collection module 210 receives source content 112 from content device 110 for processing. In an alternative embodiment, source content 112 may be collected by server 120 and stored in database 122 and data collection module 210 receives source content 112 from database 122.

Word embedding module 212 processes the collected linguistic data using word embedding techniques. Word embedding enables the quantification and categorization of semantic similarities between words based on their distributional properties in large samples of linguistic data. Word embedding techniques involve mapping linguistic segments, e.g., words and/or phrases, to vectors of real numbers. Word embedding module 212 may use a variety of word embedding methods and algorithms including, but not limited to, word2vec and Global Vectors for Word Representation (GloVe).

Sentence embedding module 214 processes the collected linguistic data using sentence embedding techniques. Sentence embedding is similar to word embedding only using larger semantic segments, e.g. sentences. Sentence embedding module 214 may use a variety of sentence embedding methods and algorithms including, but not limited to, methods and algorithms using recurrent neural networks (RNNs) and/or long short term memory (LSTM).

Sentence clustering module 216 processes the embedded linguistic data using sentence clustering techniques to group (cluster) sentence level texts into logical groups (clusters). Sentence clustering module 216 then generates a representative sentence or cluster index for each cluster. For example, source content 112 may contain the following sentences: 1) IBM®, Corp. (IBM is a registered trademark of International Business Machines, Corp.) earned a record 8,088 U.S. patents in 2016; 2) IBM®, Corp. has earned more patents than any other company for the past 24 years; 3) Fortune® (FORTUNE is a registered trademark of Time, Inc.) magazine reports today on 2016 issued U.S. patents; and 4) Fortune® magazine interviews IBM® Chief Innovation Officer about issued U.S. Patents. In the example, sentence clustering module 216 breaks down the above sentences into two clusters; sentences 1 and 2 would be clustered together as they both pertain to the topic of IBM® Patents and sentences 3 and 4 would be clustered together as the both pertain to the topic of Fortune Magazine Reporting. Sentence clustering module 216 would then generate a representative sentence for each cluster such as "IBM®, Corp. earned more U.S. patents in last 24 years than any other company" and "Fortune® magazine interviews IBM® Chief Innovation Officer for report on 2016 issued U.S. patents". Alternatively, sentence clustering module 216 may select a sentence from the cluster of sentences to be the representative sentence of the cluster. Sentence clustering module 216 may choose the representative sentence from the cluster of sentences randomly or based on a predetermined algorithm, such as which sentence maps the closest to the other sentences of the cluster within a vector. In another embodiment, sentence clustering module 216 may generate a cluster index for each sentence cluster.

Sentence sequencing module 218 transforms source content 112 into a set of sentence sequences or a sequence of sentence clustering indexes by replacing each sentence in source content 112 using the representative sentence of its cluster or using the sentence clustering index. For example, source content 112 may contain ten sentences clustered into five clusters of two sentences based on word embedding, sentence embedding, and sentence clustering. Sentence sequencing module 218 will transform source content 112 into a sequence of the five clusters, with each cluster being represented by a single sentence. Alternatively, sentence sequencing module 218 will transform source content 112 into a sequence of the five clusters, with each cluster being represented by a sentence clustering index, e.g. S1, S2, S3, S4, and S5. Thus, sentence sequencing module 218 may transform source content 112 from ten sentences into S1→S2→S3→S4→S5.

Contextual sentence module 220 processes the sequenced linguistic data using contextual sentence embedding techniques. Contextual sentence embedding uses methods and algorithms including, but not limited to, contextual continuous bag-of-sentences (cc-bos) and contextual skip-gram (c-sg) to transform and represent sentences by their surrounding sentences, creating representative, or contextual, sentences. Contextual sentence embedding differs from the sentence embedding of sentence embedding module 214. Contextual sentence embedding involves mapping representations of particular sentences with a sentence being represented its surrounding sentences. For example, the second sentence cluster index (sS2) of source content 112 may be represented using the values of the first, third and fourth sentence cluster indexes (S2, S3, S4) of source content 112.

Sentence block module 222 processes the contextually embedded linguistic data and identifies the relationships between the sentences of source content 112 to create sentence blocks, which map the relationship between the sentences based in their contextual representation. For example, source content 112 may be a dialogue between a customer and a service agent. The customer states a problem in an initiating statement, which in turn may cause the service agent to respond in various ways, which in turn causes the customer to respond. In this example dialogue, there would be three sentence blocks created, each starting with the customer's initiating statement and ending with the customer's response and having one possible service agent response in the middle. Sentence block formation is described in more detail with reference to FIG. 3.

Cohesion module 224 analyzes sentence blocks created from all source content 112 and identifies similarities between the sentence blocks. These similarities between sentence blocks are referred to as cohesions. A threshold for determining similarity between sentence blocks may be manually defined, such as the topic of the sentence block. Further, cohesion module 224 may merge sentence blocks together if the similarities between the two sentence blocks exceed the manually set threshold.

Procedure flow module 226 produces procedure flows based on the cohesions between the sentence blocks. Procedure flow formation is described in more detail with reference to FIGS. 4-5.

Figure 2:
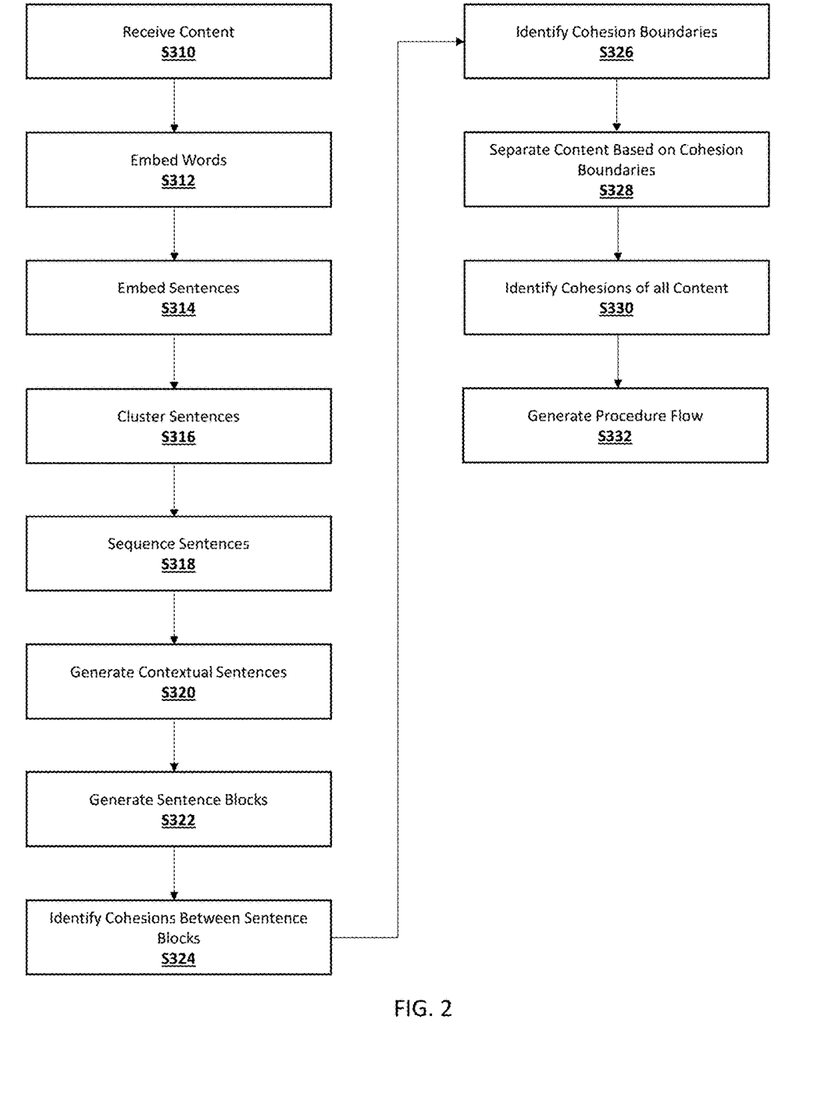
FIG. 2 is a flowchart illustrating an example method of procedure dialog mining, in accordance with an embodiment of the invention.

FIG. 2 is a flowchart illustrating a method for mining procedure dialogs from source content, in accordance with an embodiment of the invention.

Referring to step S310, data collection module 210 of procedure dialog mining program 124 receives source content 112. Furthermore, procedure dialog mining program 124 may receive source content 112 using data collection module 210 from one or more sources, or one or more devices. For example, procedure dialog mining program 124 may receive source content from databases containing call center records, technical documents, question and answer forum data, and/or website news, etc.

Referring to step S312, word embedding module 212 of procedure dialog mining program 124 embeds the words of collected source content 112. Procedure dialog mining program 124 may embed the words of source content 112 by mapping the individual words to vectors of real numbers. These word vectors of real numbers are positioned within a vector space such that words that share common contexts are near one another in the vector space. In an example embodiment, procedure dialog mining program 124 may utilize a neural network, such as, but not limited to, word2vec to embed the words of source content 112. Word2vec may utilize either continuous bag-of-words (CBOW) architecture model or continuous skip-gram (C-SG) model architecture to embed the words of source content 112. CBOW enables the prediction of a word based its surrounding words. C-SG enables the prediction of surrounding words based on a single word.

Referring to step S314, sentence embedding module 214 of procedure dialog mining program 124 embeds the sentences of source content 112. Sentence embedding uses similar mapping techniques as word embedding using larger semantic elements of the source content 112, e.g. sentences. Thus, sentences of source content 112 would be mapped to vectors of real numbers with those sentence vectors being positioned within a vector space near other sentence vectors that share similar contexts.

Referring to step S316, sentence clustering module 216 of procedure dialog mining program 124 clusters the sentences of source content 112. Sentence clustering is described in more detail above with reference to sentence clustering module 216.

Referring to step S318, sentence sequencing module 218 of procedure dialog mining program 124 transforms source content 112 into a set of sentence sequences or a sequence of sentence clustering indexes. Sentence sequencing is described in more detail above with reference to sentence sequencing module 218.

In an example embodiment steps S312, S314, S316, and S318 may occur simultaneously or in any order.

Referring to step S320, contextual sentence module 220 of procedure dialog mining program 124 processes the sequenced and embedded source content into contextually represented linguistic data. Contextually represented linguistic data is linguistic data that is represented by the surrounding linguistic data. For example, source content 112 may have sentences S1, S2, and S3. Sentence S2 may be contextually represented as a function of sentences S1 and S3. Contextual sentence embedding is described in more detail above with reference to contextual sentence module 220.

Referring to step S322, procedure dialog mining program 124 processes the contextualized linguistic data and identifies the relationships between the sentences of source content 112 using sentence block module 222. Sentence block module 222 creates sentence blocks, which map the relationship between the sentences based on the sentences' contextual representation. Sentence block formation is described in more detail with reference to FIGS. 1b and 3.

Referring to step S324, cohesion module 224 of procedure dialog mining program 124 analyzes sentence blocks created from source content 112 to identify similarities between the sentence blocks. These similarities between sentence blocks are referred to as cohesions. For example, procedure dialog mining program 124 may identify all sentence blocks of a single call center conversation that relate to printer hardware troubleshooting.

Referring to step S326, cohesion module 224 of procedure dialog mining program 124 analyzes the cohesions between sentence blocks of source content 112 to identify the relationships, such as topic, within source content 112. For example, a single call center conversation may cover various topics such as printer hardware troubleshooting and wireless printing troubleshooting. Procedure dialog mining program 124 will identify the cohesion boundaries, e.g. all content relating to printer hardware versus all content relating to wireless printing and separate the source content conversation accordingly at step S328.

Referring to step S330, cohesion module 224 of procedure dialog mining program 124 identifies the cohesions between all sentence blocks of all source content 112, e.g. not just a single call center conversation, but all call center conversations.

Referring to step S332, procedure dialog mining program 124 processes all related sentence blocks using procedure flow module 226 and generates a procedure flow. Procedure flow formation is described in more detail with reference to FIGS. 4 and 5.

Figure 3:
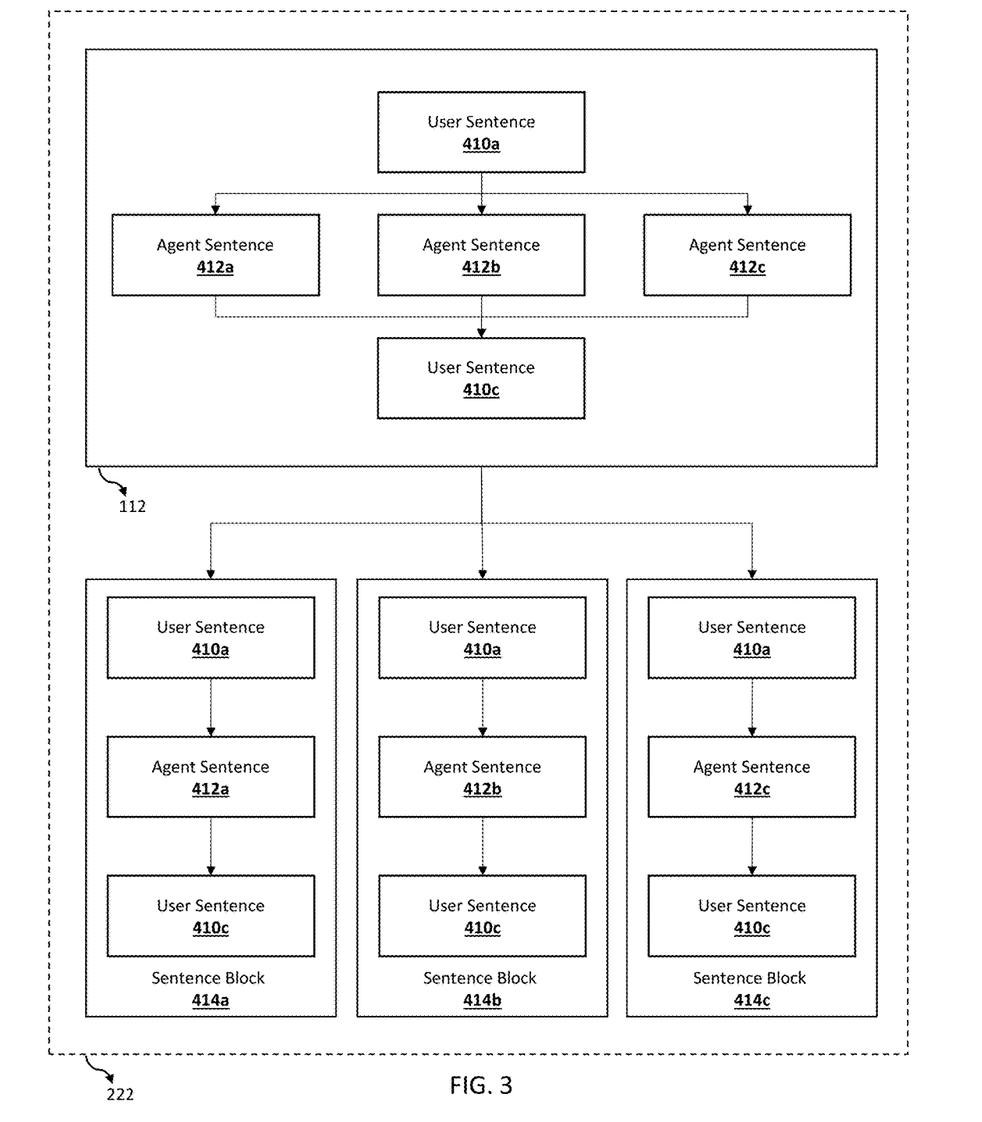
FIG. 3 illustrates an example method of sentence block formation by the procedure dialog mining program of FIGS. 1a-b, in accordance with an embodiment of the invention.

FIG. 3 illustrates sentence block formation using sentence block module 222 of procedure dialog mining program 124, in accordance with an embodiment of the invention. Sentence block module 222 processes the contextually embedded linguistic data and identifies the relationships between the sentences of source content 112 to create sentence blocks. For example, source content 112 may be a dialogue between a customer and a service agent. The contextually embedded linguistic data of this dialogue may be user sentences 410 and agent sentences 412. User sentence 410a may cause agent sentence 412a, 412b, and/or 412c, which then cause user sentence 410c. Thus, sentence block module 222 transforms user sentences 410 and agent sentences 412 into sentence blocks 414. User sentences 410 and agent sentences 412 are represented in sentence blocks 414 in their contextually embedded form.

Figure 4:
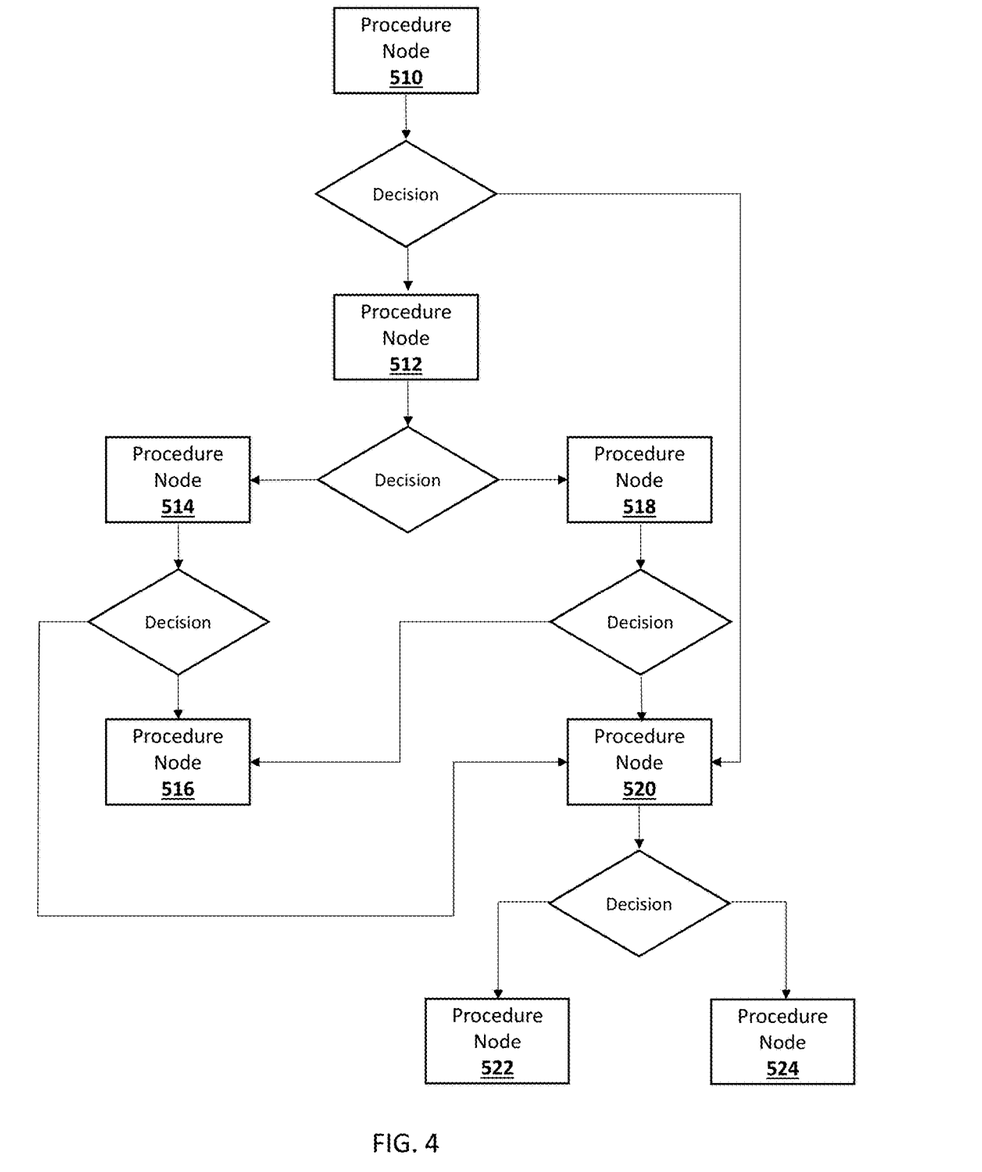
FIG. 4 is a flowchart illustrating an example procedure flow generated by the procedure dialog mining program of FIGS. 1a-b, in accordance with an embodiment of the invention.

FIG. 4 is a flowchart illustrating an example procedure flow generated by procedure dialog mining program 124, in accordance with an embodiment of the invention. Procedure flow module 226 processes the cohesions of sentence blocks to produce procedure nodes and identifies all possible flows between the procedure nodes.

In an example embodiment, the procedure nodes are questions presented to a user and the overall procedure flow represents all possible dialogue flows. For example, procedure node 510 is the starting point of a procedure flow where the system asks a user to indicate his/her problem. In the example embodiment, a user may indicate one of two problem areas and the system proceeds accordingly to either procedure node 512 or procedure node 520. The system continues presenting a user with questions, processing the user's responses, and proceeding along the procedure flow until a solution is achieved at procedure node 522 or procedure node 524. An example procedure flow dialogue following the format of FIG. 4 is illustrated in FIG. 5.

Figure 5:
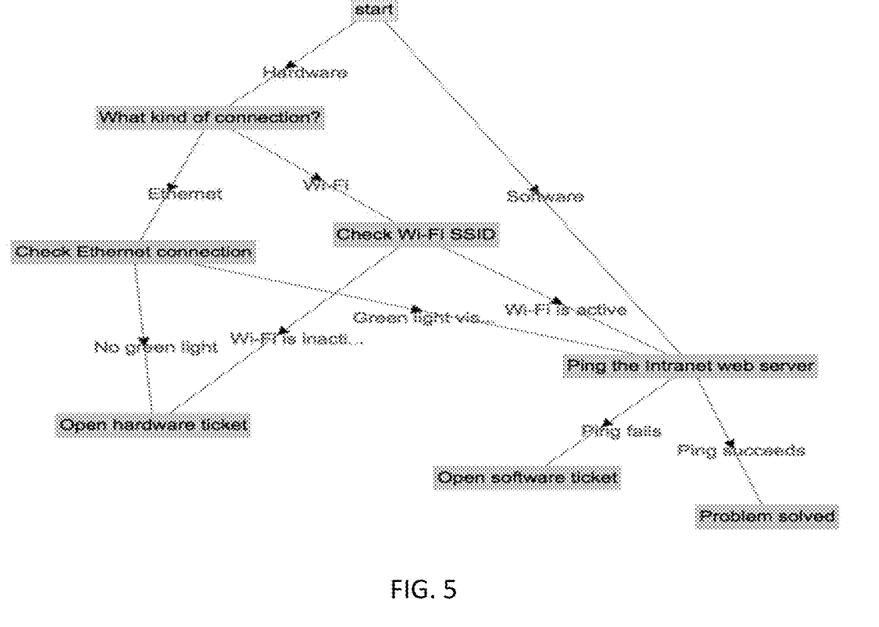
FIG. 5 is a flowchart illustrating an example procedure flow dialogue generated by the procedure dialog mining program of FIGS. 1a-b, in accordance with an embodiment of the invention.

Referring to FIG. 5, procedure dialog mining program 124, based on the procedure flow, determines if a user's problem is hardware or software related. Procedure dialog mining program 124 proceeds through the procedure flow according to the user's response to the first question. If the user indicates a hardware problem, the next step determines the type of connection the user has. Procedure dialog mining program 124 will then check the connection and if the connection is not available, the program opens a hardware ticket. If procedure dialog mining program 124 is able to detect a connection, the program proceeds to ping the intranet web server and if the ping fails the system opens a software ticket. If procedure dialog mining program 124 determines the ping was successful, the program closes. Returning to the beginning of the procedure flow, if the user indicates a software issue, procedure dialog mining program 124 proceeds directly to the step of pinging the intranet web server and proceeds from there as described above.

Figure 6:
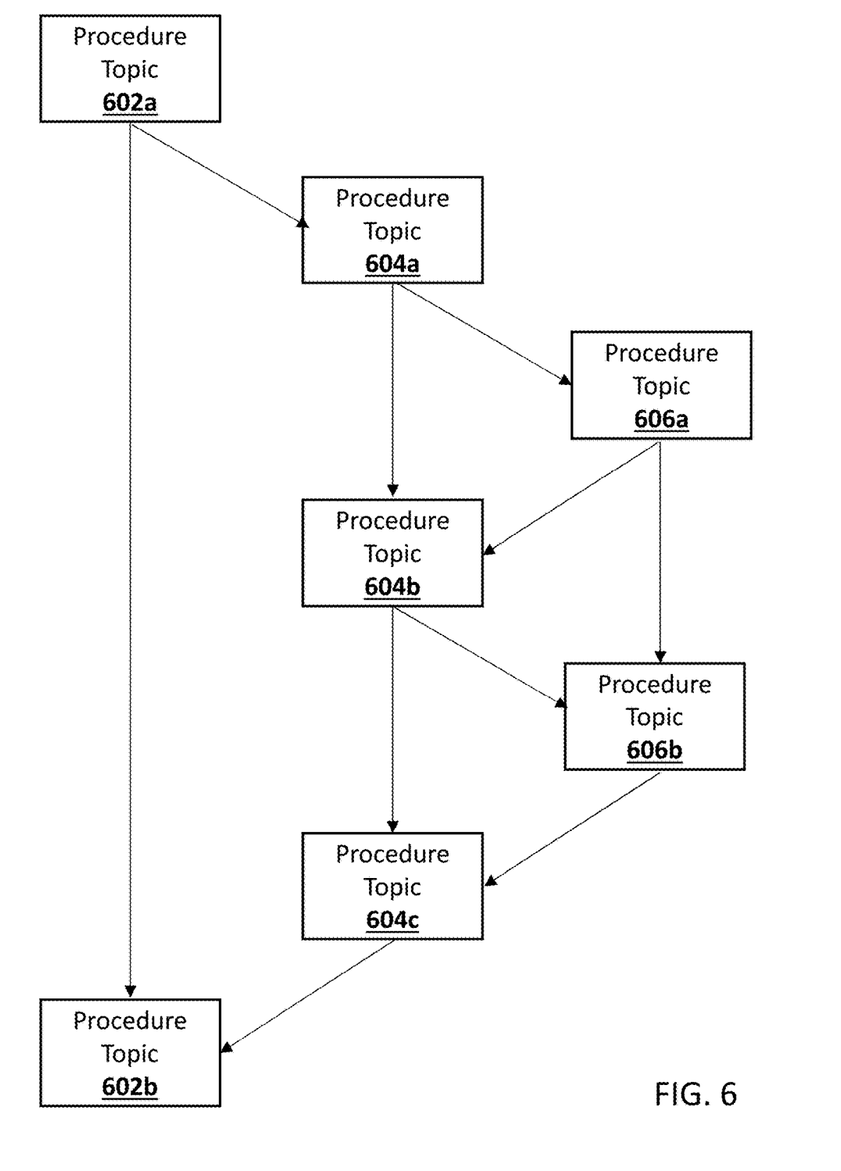
FIG. 6 is a flowchart illustrating interrelated procedure flow topics generated by the procedure dialog mining program of FIGS. 1a-b, in accordance with an embodiment of the invention.

FIG. 6 is a flowchart illustrating interrelated procedure flow topics. It can be appreciated that source content 112 may contain, for example, a single customer service dialogue spanning several different related or unrelated topics. Procedure dialog mining program 124 using cohesion module 224 identifies cohesions between all source content 112 and generates a procedure flow as described above. Further, procedure dialog mining program 124 using cohesion module 224 is able to map cohesions between different topics of data.

Referring to FIG. 6, for example, procedure dialog mining program 124 identifies three interrelated topics 602, 604, and 606 and maps the cohesions between the topics. Topic 602 may be broken down into two subtopics 602a-b, topic 604 may be broken down into three subtopics 604a-c, and topic 606 may be broken down into two subtopics 606a-b. Procedure dialog mining program 124 may identify relationships between the various topics and subtopics. In the example, subtopic 602a may be flow to subtopic 602b or to subtopic 604a. Subtopic 604a may flow to subtopic 604b or to subtopic 606a. Subtopic 604b may flow to subtopic 604c or to subtopic 606b. Subtopic 606a may flow to subtopic 606b or to subtopic 604b. Subtopic 606b may flow to subtopic 604c, which in turn may flow to subtopic 602b.

Figure 7:
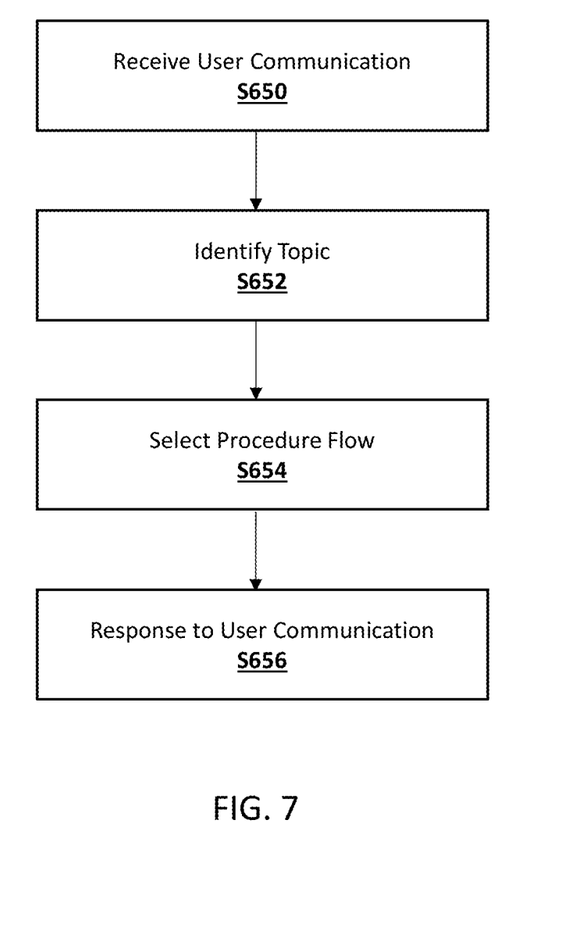
FIG. 7 is a flowchart illustrating and example method of procedure dialog mining, in accordance with an embodiment of the invention.

FIG. 7 is a flowchart illustrating a method for receiving user communications and selecting an appropriate procedure flow, in accordance with an embodiment of the invention.

Referring to step S650, server 120 receives user communication from user device 130. User communication may be in any form such as, but not limited to, a phone call, an email, a website inquiry, etc. Server 120 analyzes and identifies the topic of the user communication at step S652. Referring to step S654, server 120 selects the appropriate procedure flow, created by procedure dialog mining program 124, stored in database 122 and responds to the user communication at step S656 based on the identified procedure dialog.

Figure 8:
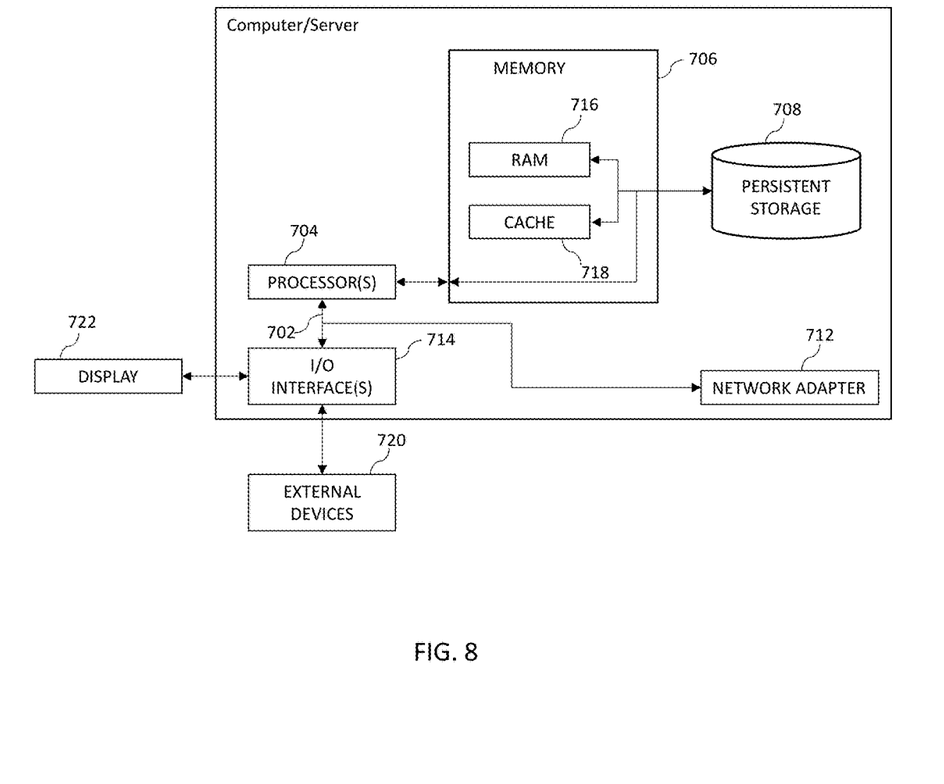
FIG. 8 is a block diagram depicting the hardware components of the procedure dialog mining system of FIGS. 1a-b, in accordance with an embodiment of the invention.

FIG. 8 depicts a block diagram of components of procedure dialog mining server 120, content device 110 and user device 130, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Procedure dialog mining server 120, content device 110 and user device 130 may include communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

The programs procedure dialog mining program 124 and procedure dialog mining database 122 in procedure dialog mining server 120; source content 112 in content device 110; and user interface 132 stored in user device 130 are stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. The programs procedure dialog mining program 124 and procedure dialog mining database 122 in procedure dialog mining server 120; source content 112 in content device 110; and user interface 132 stored in user device 130 may be downloaded to persistent storage 708 through communications unit 712.

I/O interface(s) 714 allows for input and output of data with other devices that may be connected to procedure dialog mining server 120, content device 110 and user device 130. For example, I/O interface 714 may provide a connection to external devices 720 such as a keyboard, keypad, a touch screen, and/or some other suitable input device. External devices 720 can also include portable computer-readable storage media such as, for example, thumb drives, portable optical or magnetic disks, and memory cards. Software and data used to practice embodiments of the present invention, e.g., the programs of procedure dialog mining program 124 and procedure dialog mining database 122 in procedure dialog mining server 120; source content 112 in content device 110; and user interface 132 stored in user device 130, can be stored on such portable computer-readable storage media and can be loaded onto persistent storage 708 via I/O interface(s) 714. I/O interface(s) 714 can also connect to a display 722.

Display 722 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
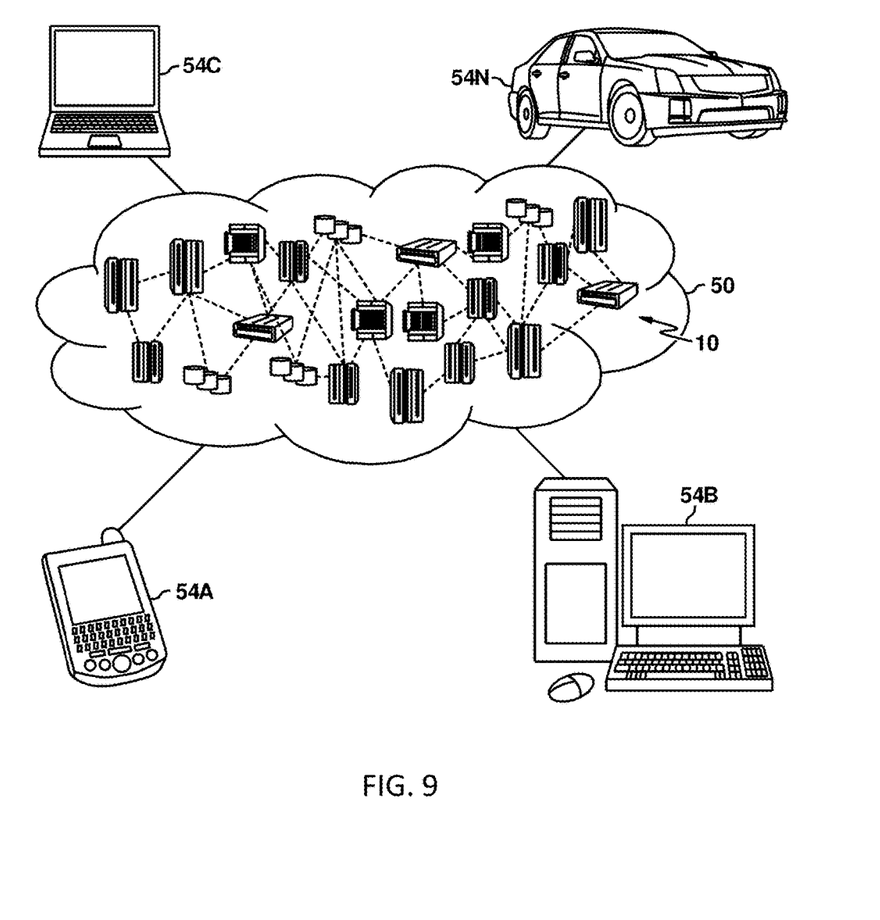
FIG. 9 illustrated a cloud computing environment, in accordance with an embodiment of the invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
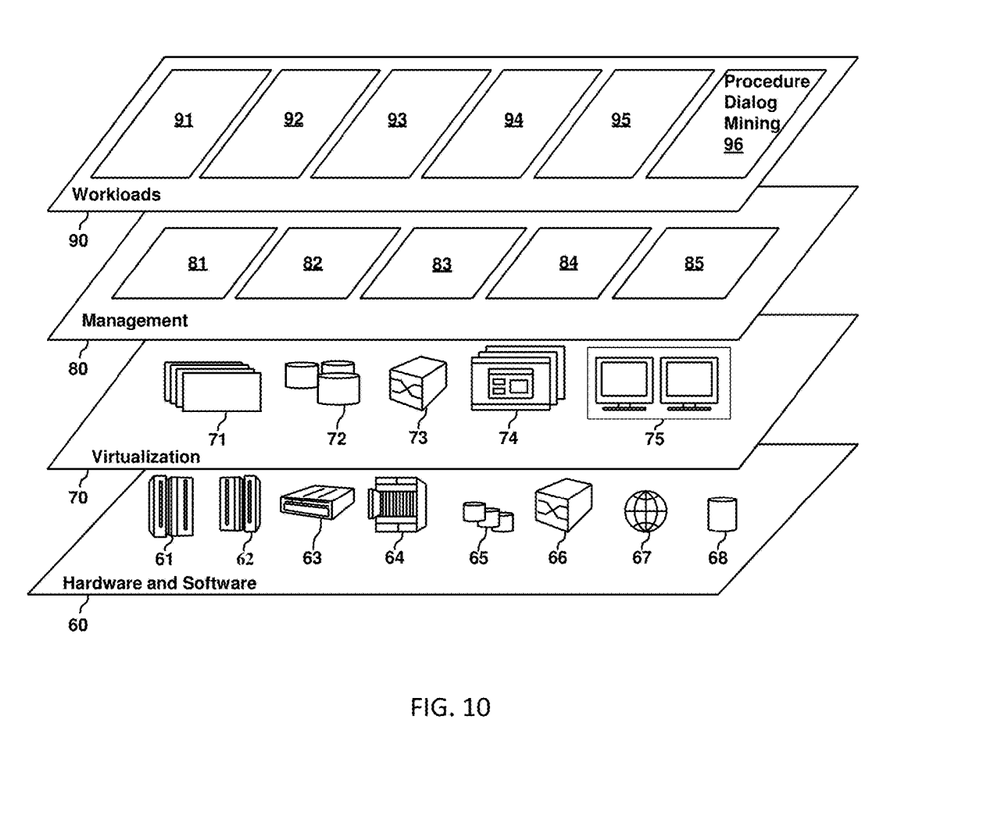
FIG. 10 illustrates a set of functional abstraction layers provided by the cloud computing environment of FIG. 9, in accordance with an embodiment of the invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and procedure dialog mining 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for human-machine communication, the method comprising:
    receiving source content, the source content comprising linguistic data, from one or more databases at a server communicating with the one or more databases using a communication network;
    embedding the linguistic data of the source content to a high-dimensional vector using a neural network;
    clustering the sentences of the source content into a plurality of sentence groups based on the embedded linguistic data;
    sequencing the clustered sentence groups of the source content into a set of sentence sequences, wherein each of the plurality of sentence groups is represented by a single representative sentence;
    transforming each sentence of the source content by replacing each sentence with the single representative sentence of the sentence group that each sentence is sequenced into;
    embedding each representative sentence of the source content based on the sentence that precedes and follows each sentence;
    mapping the relationships between the embedded representative sentences of the source content;
    identifying related representative sentences of the source content;
    generating linguistic data blocks comprised of the related representative sentences of the source content;
    identifying similarities between the linguistic data blocks based on cohesions;
    separating the linguistic data blocks into groups based on the cohesions identified; and
    generating a procedure dialogue based on the cohesions between data blocks of the same group.

* * * * *